United States Patent
Roh et al.

(10) Patent No.: US 9,943,460 B2
(45) Date of Patent: Apr. 17, 2018

(54) DRIVING MODULE AND MOTION ASSISTANCE APPARATUS INCLUDING THE SAME

(71) Applicant: Samsung Electronics Co., Ltd., Suwon-Si, Gyeonggi-Do (KR)

(72) Inventors: Se-gon Roh, Suwon-si (KR); Jongwon Lee, Uiwang-si (KR); Jeonghun Kim, Hwaseong-si (KR); Minhyung Lee, Anyang-si (KR); Youn Baek Lee, Yongin-si (KR); Byungjune Choi, Gunpo-si (KR); Hyun Do Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 603 days.

(21) Appl. No.: 14/559,051

(22) Filed: Dec. 3, 2014

(65) Prior Publication Data

US 2016/0030271 A1 Feb. 4, 2016

(30) Foreign Application Priority Data

Jul. 29, 2014 (KR) .................. 10-2014-0096346

(51) Int. Cl.
*A61H 1/00* (2006.01)
*A61H 3/00* (2006.01)
*F16H 19/06* (2006.01)
*F16H 1/28* (2006.01)
*A61H 1/02* (2006.01)

(52) U.S. Cl.
CPC ............. *A61H 3/00* (2013.01); *A61H 1/0244* (2013.01); *A61H 1/0277* (2013.01);
(Continued)

(58) Field of Classification Search
CPC ........ A61H 1/02; A61H 1/0237; A61H 1/024; A61H 1/0244; A61H 1/0262; A61H 3/00;
(Continued)

(56) References Cited

U.S. PATENT DOCUMENTS

| 5,246,465 A * | 9/1993 | Rincoe ...................... A61F 2/64 623/24 |
| 5,282,460 A * | 2/1994 | Boldt ........................ A61F 2/68 403/119 |

(Continued)

FOREIGN PATENT DOCUMENTS

| JP | 2013000296 A | 1/2013 |
| KR | 1020130045826 A | 5/2013 |
| KR | 1020140001419 A | 1/2014 |

*Primary Examiner* — Steven Douglas
(74) *Attorney, Agent, or Firm* — Harness, Dickey & Pierce, P.L.C.

(57) ABSTRACT

A driving module and a motion assistance apparatus including the same may be provided. For example, the driving module including a driving source provided on one side of a user and configured to transmit power, a power transmitting rotary body configured to rotate by the power transmitted from the driving source, and a first decelerator configured to transmit power between the driving source and the power transmitting rotary body, the first decelerator having an input side rotary body configured to receive power from the driving source, and an output side rotary body configured to transmit power to the power transmitting rotary body may be provided.

16 Claims, 10 Drawing Sheets

(52) U.S. Cl.
CPC ......... *A61H 1/0281* (2013.01); *A61H 1/0285* (2013.01); *F16H 19/06* (2013.01); *A61H 1/0266* (2013.01); *A61H 2003/007* (2013.01); *A61H 2201/1207* (2013.01); *A61H 2201/1215* (2013.01); *A61H 2201/149* (2013.01); *A61H 2201/1463* (2013.01); *A61H 2201/1472* (2013.01); *A61H 2201/165* (2013.01); *A61H 2201/5007* (2013.01); *F16H 1/28* (2013.01); *F16H 2019/0677* (2013.01); *F16H 2019/0695* (2013.01)

(58) Field of Classification Search
CPC ...... A61H 2003/007; A61H 2201/0107; A61H 2201/0157; A61H 2201/0173; A61H 2201/0176; A61H 2201/1207; A61H 2201/1215; A61H 2201/1436; A61H 2201/1463; A61H 2201/1472; A61H 2201/1628; A61H 2201/163; A61H 2201/164; A61H 2201/1642; A61H 2201/1645; A61H 2201/1664; A61H 2201/1666; A61H 2201/1671; A61H 2201/1673; A61H 2201/1676; A61H 2201/5053

See application file for complete search history.

(56) References Cited

U.S. PATENT DOCUMENTS

| | | | |
|---|---|---|---|
| 8,274,244 B2 * | 9/2012 | Horst | A61F 2/68 310/83 |
| 8,435,309 B2 * | 5/2013 | Gilbert | A61F 2/582 623/24 |
| 8,814,949 B2 * | 8/2014 | Gramnaes | A61F 2/64 623/27 |
| 2005/0014600 A1 * | 1/2005 | Clauson | B60K 6/365 477/2 |
| 2011/0066088 A1 | 3/2011 | Little et al. | |
| 2013/0060175 A1 * | 3/2013 | Chen | A61H 7/004 601/108 |
| 2015/0025423 A1 * | 1/2015 | Caires | A61H 1/024 601/35 |
| 2016/0038313 A1 * | 2/2016 | Kim | B25J 9/104 623/24 |
| 2016/0038368 A1 * | 2/2016 | Lee | A61H 3/00 623/24 |
| 2016/0106615 A1 * | 4/2016 | Lee | A61H 3/00 414/4 |
| 2016/0193102 A1 * | 7/2016 | Roh | A61H 3/00 623/27 |
| 2016/0215864 A1 * | 7/2016 | Kim | A61F 2/60 |
| 2016/0310344 A1 * | 10/2016 | Shimada | A61H 3/00 |

* cited by examiner

DRIVING MODULE AND MOTION ASSISTANCE APPARATUS INCLUDING THE SAME

CROSS-REFERENCE TO RELATED APPLICATION

This application claims the priority benefit of Korean Patent Application No. 10-2014-0096346, filed on Jul. 29, 2014, in the Korean Intellectual Property Office, the disclosure of which is incorporated herein by reference in its entirety.

BACKGROUND

1. Field

Example embodiments relate to driving modules and/or motion assistance apparatuses including the same.

2. Description of the Related Art

With the onset of rapidly aging societies, a number of people may experience inconvenience and/or pain from joint problems. Thus, there is a growing interest in motion assistance apparatuses enabling the elderly and/or patients having joint problems to walk with less effort. Furthermore, motion assistance apparatuses increasing muscular strength of human bodies may be useful for military purposes.

In general, motion assistance apparatuses for assisting motion of lower parts of bodies may include body frames disposed on trunks of users, pelvic frames coupled to lower sides of the body frames to cover pelvises of the users, femoral frames disposed on thighs of the users, sural frames disposed on calves of the users, and/or pedial frames disposed on feet of the users. The pelvic frames and femoral frames may be connected rotatably by hip joint portions, the femoral frames and sural frames may be connected rotatably by knee joint portions, and/or the sural frames and pedial frames may be connected rotatably by ankle joint portions.

The motion assistance apparatuses may include active joint structures including hydraulic systems and/or driving motors to drive each joint portion to improve muscular strength of legs of the users. For example, separate motors to transmit driving power may be provided at left and right hip joint portions, respectively.

SUMMARY

At least one example embodiment relates to a motion assistance apparatus.

According to an example embodiment, a driving module includes a driving source on one side of a user, the driving source configured to transmit power, a power transmitting rotary body configured to rotate by the power transmitted from the driving source, and a first decelerator configured to transmit power between the driving source and the power transmitting rotary body. The first decelerator includes an input side rotary body configured to receive power from the driving source, and an output side rotary body configured to transmit power to the power transmitting rotary body.

In some example embodiments, the driving source and the power transmitting rotary body may be in a same direction with respect to the first decelerator.

In some example embodiments, the first decelerator may further include an idle rotary body configured to transmit power between the input side rotary body and the output side rotary body. Diameters of the input side rotary body, the idle rotary body, and the output side rotary body may increase sequentially in an order of power transmission.

In some example embodiments, the driving module may further include a second decelerator between the first decelerator and the power transmitting rotary body.

In some example embodiments, the second decelerator may include a central rotary body configured to receive power transmitted from the first decelerator, a connecting rotary body coupled to or connected to an outer circumferential surface of the central rotary body, and a ring member surrounding the central rotary body and the connecting rotary body, and coupled to or connected to the connecting rotary body.

In some example embodiments, the connecting rotary body may include a first portion coupled to or in contact with the outer circumferential surface of the central rotary body, and a second portion coupled to or in contact with an inner circumferential surface of the ring member, the second portion having a smaller diameter than the first portion.

In some example embodiments, the ring member may be configured to not rotate in an internal portion of the driving module, and the power transmitting rotary body may be configured to rotate in a revolving direction of the connecting rotary body.

In some example embodiments, the connecting rotary body may be configured to rotate at a desired position in an internal portion of the driving module, and the power transmitting rotary body may be configured to rotate in a rotating direction of the ring member.

In some example embodiments, the driving module may further include a power transmitting member configured to be driven by rotation of the power transmitting rotary body, and a tensile force adjusting device configured to adjust a tensile force of the power transmitting member.

In some example embodiments, the tensile force adjusting device may include a hanging portion configured to move with respect to the power transmitting rotary body, at which one side of the power transmitting member is hung. The tensile force of the power transmitting member may increase when the hanging portion moves to one side, and the tensile force of the power transmitting member may decrease when the hanging portion moves to another side.

In some example embodiments, the power transmitting rotary body may include a groove along which a portion of the power transmitting member is wound, and an insertion hole on one side of the groove. One side of the power transmitting member may penetrate through the insertion hole and is hung at the hanging portion.

In some example embodiments, the tensile force adjusting device may further include a fixing portion configured to attach to one end of the power transmitting member, and a hanging portion movement guide configured to guide a moving direction of the hanging portion. The power transmitting member may extend from the insertion hole in one direction to be hung over the hanging portion, and extend from the hanging portion in a direction opposite to the one direction to be attached to the fixing portion.

In some example embodiments, the hanging portion may be configured to slide along to the hanging portion movement guide.

In some example embodiments, the hanging portion movement guide may include a screw, and a separation preventing portion configured to prevent separation of the screw, and the hanging portion may include a hanging body having a guide hole corresponding to the screw, and a hanging pulley rotatably provided on the hanging body, at which one side of the power transmitting member is hung.

According to another example embodiment, a motion assistance apparatus includes a fixing member configured to be attached to a user, a driving module on one side of the fixing member, a supporting module configured to support a portion of the user, and a power transmitting member configured to transmit power between the power transmitting rotary body and the supporting module. The driving module includes a driving source, a power transmitting rotary body, and a parallel shaft decelerator. The power transmitting rotary body is configured to rotate by power transmitted from the driving source. The parallel shaft decelerator is configured to transmit power between the driving source and the power transmitting rotary body. The parallel shaft decelerator includes an input side rotary body configured to receive power from the driving source, and an output side rotary body configured to transmit power to the power transmitting rotary body, In some example embodiments, the motion assistance apparatus may further include a planetary decelerator between the output side rotary body and the power transmitting rotary body.

In some example embodiments, an axis of rotation of the output side rotary body, a central axis of rotation of the planetary decelerator, and an axis of rotation of the power transmitting rotary body may be in a same direction.

In some example embodiments, the driving module may further include a tensile force adjusting device configured to adjust a tensile force of the power transmitting member.

In some example embodiments, the tensile force adjusting device may include a hanging portion configured to move with respect to the power transmitting rotary body, at which one side of the power transmitting member is hung. The tensile force of the power transmitting member may increase when the hanging portion moves to one side, and the tensile force of the power transmitting member may decrease when the hanging portion moves to another side.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Various example embodiments will now be described more fully with reference to the accompanying drawings. Example embodiments, however, may be embodied in many different forms and should not be construed as being limited to the example embodiments set forth herein. Rather, these example embodiments are provided so that this disclosure will be thorough and complete, and will fully convey the scope of example embodiments to those skilled in the art. In the drawings, the sizes and relative sizes of various layers and regions may have been exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
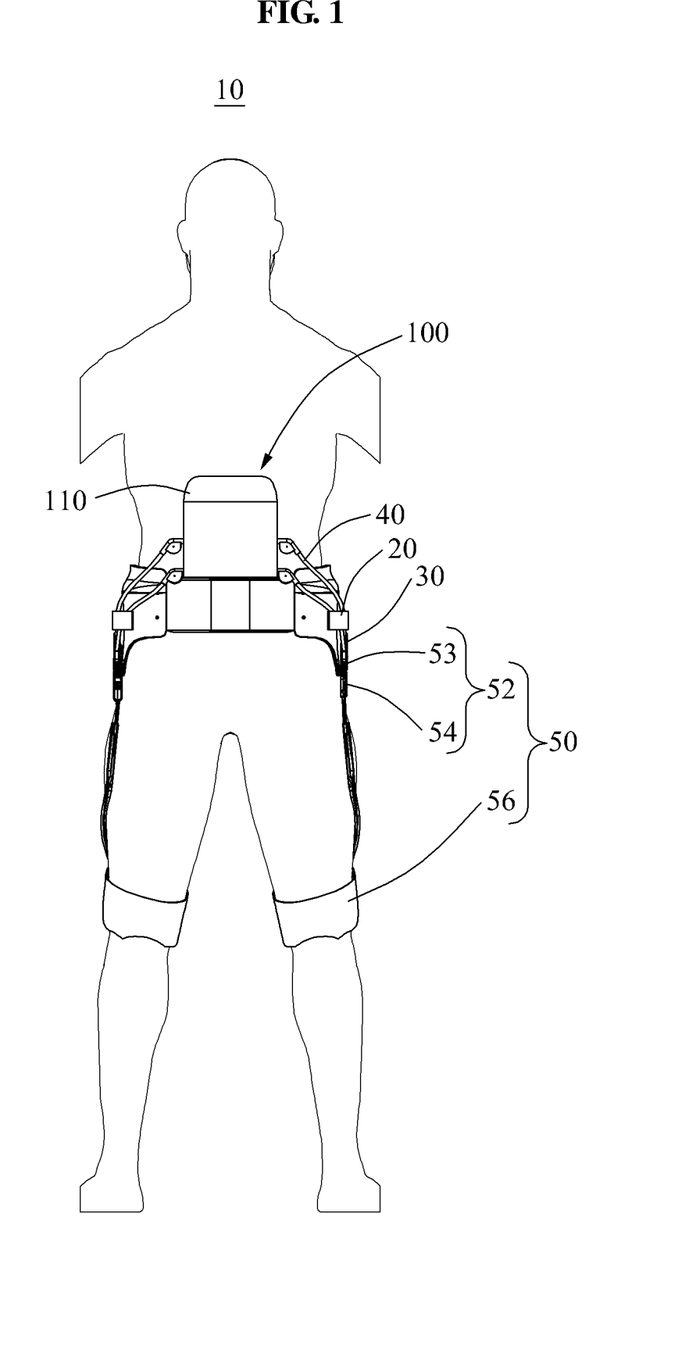
FIG. 1 is a rear view illustrating a user wearing a motion assistance apparatus according to an example embodiment.
Figure 2:
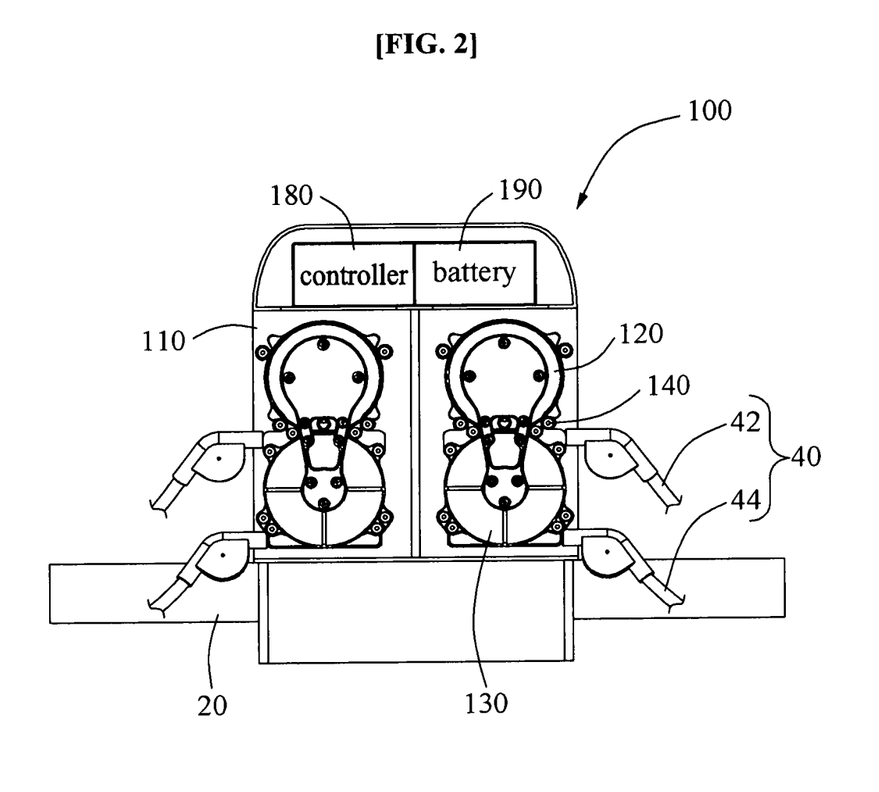
FIG. 2 illustrates a driving module according to an example embodiment.

FIG. 1 is a rear view illustrating a user wearing a motion assistance apparatus 10 according to an example embodiment, and FIG. 2 illustrates a driving module 100 according to an example embodiments. FIG. 2 illustrates the driving module 100 with a case removed, as an example.

Referring to FIGS. 1 and 2, the motion assistance apparatus 10 may be worn by a user to assist a motion of the user.

The user may be a human, an animal, or a robot. However, the user is not limited thereto. Further, although FIG. 1 illustrates a case in which the motion assistance apparatus 10 assists a motion of a thigh of the user, the motion assistance apparatus 10 may also assist a motion of another part of an upper body (e.g., a hand, an upper arm, or a lower arm of the user), or a motion of another part of a lower body (e.g., a foot or a calf of the user). The motion assistance apparatus 10 may assist a motion of a part of the user.

Hereinafter, a case in which the motion assistance apparatus 10 assists a motion of a thigh of a human will be described as an example.

The motion assistance apparatus 10 includes a fixing member 20, the driving module 100, a power transmitting member 40, and a supporting module 50.

The fixing member 20 may be attached to the user. The fixing member 20 may be in contact with at least a portion of an outer surface of the user. The fixing member 20 may cover the outer surface of the user. The fixing member 20 may include a curved surface to provide improved contact with the user. For example, the fixing member 20 may be attached to one side of a waist of the user.

The driving module 100 may be provided on one side of the fixing member 20. For example, the driving module 100 may be provided in a form of a backpack. The driving module 100 may be provided on a rear side of the user and/or an upper side of the fixing member 20. The driving module 100 may be disposed to be spaced apart from the supporting module 50. The driving module 100 may be disposed on an opposite side of the supporting module 50 with respect to the fixing member 20. In the foregoing structure, the driving module 100 may be provided on one side of the user in a form of a single module, thereby improving convenience of maintenance and management. Further, a volume of a product to be disposed on a joint portion may be reduced.

The driving module 100 includes a driving module case 110 configured to form an appearance of the driving module 100, a driving source 120 configured to operate by a voltage or a current transmitted from a battery 190, a rotary body assembly 130 configured to receive power from the driving source 120 to drive the power transmitting member 40, a first decelerator 140 configured to decelerate the power transmitted from the driving source 120 to the rotary body assembly 130, a controller 180 configured to control the driving source 120, and the battery 190. The driving module case 110 may be provided to be opened and closed. The driving module 100 will be described in detail later.

The controller 180 may include a processor and a memory (not shown). The controller 180 may be an arithmetic logic unit, a digital signal processor, a microcomputer, a field programmable array, a programmable logic unit, a microprocessor or any other device capable of responding to and executing instructions in a defined manner such that the controller 180 is programmed with instructions that configure the processing device as a special purpose computer and to control at least the driving source 120 and the battery 190 of the driving module 100 of the motion assistance apparatus 10.

The instructions may be stored on a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors.

The power transmitting member 40 may be disposed between the driving module 100 and the supporting module 50. The power transmitting member 40 may transmit power from the driving module 100 to the supporting module 50. The power transmitting member 40 may transmit power using a pushing or pulling force, or transmit power using a frictional force, a tensile force, or an elastic force. For example, the power transmitting member 40 may include a wire, a cable, a string, a rubber band, a spring, a belt, and a chain. A power input terminal of the power transmitting member 40 may be connected to the driving module 100, and a power output terminal of the power transmitting member 40 may be connected to the supporting module 50.

A tube may be provided in an external portion of the power transmitting member 40. The tube may guide the power transmitting member 40. The tube may be disposed between the driving module 100 and the supporting module 50. Through the tube, the power transmitting member 40 may operate without being obstructed by clothing while the user is wearing the clothing over the tube. The tube may be formed of a flexible material (e.g., rubber or silicone), or a rigid material (e.g., plastic, or steel). The tube may prevent a direct contact between the power transmitting member 40 and the user, thereby increasing a wearability.

A plurality of power transmitting members 40 may be provided. The power transmitting members 40 include a first power transmitting member 42 and a second power transmitting member 44. The first power transmitting member 42 and the second power transmitting member 44 connect the driving module 100 to both sides of the supporting module 50 at both sides, respectively.

The motion assistance apparatus 10 further includes a joint assembly 30. The joint assembly 30 may be disposed between the power transmitting member 40 and the supporting module 50 to transmit power. The driving module 100 and the joint assembly 30 may be connected to each other by the power transmitting member 40, and the supporting module 50 may be connected to the joint assembly 30 to be driven. The joint assembly 30 may rotate by the power received from the power transmitting member 40. For example, the joint assembly 30 may be disposed on one side of a hip joint of the user. In this example, the joint assembly 30 may also be referred to as a "hip joint assistant member".

When the plurality of power transmitting members 40 is provided, the first power transmitting member 42 may be connected to one side of the driving module 100 and one side of the joint assembly 30, and the second power transmitting member 44 may be connected to another side of the driving module 100 and another side of the joint assembly 30. In an example, a single power transmitting member 40 may be connected to the driving module 100 and the joint assembly 30 in a form of a belt.

The supporting module 50 may support a portion of the user. The supporting module 50 may assist a motion of the portion of the user. The supporting module 50 may rotate by the power received from the power transmitting member 40. A torque of the supporting module 50 may be transmitted to the portion of the user to assist the motion of the portion of the user. For example, the supporting module 50 may support a motion of a leg of the user.

The supporting module 50 includes a supporting member 56 configured to cover at least a portion of the user. For example, the supporting member 56 may be disposed to cover a circumference of at least a portion of a thigh of the user.

When the motion assistance apparatus 10 further includes the joint assembly 30, the supporting module 50 may further include a supporting frame 52. The supporting frame 52 may rotate in a rotating direction of the joint assembly 30. The supporting frame 52 includes a first supporting frame 53 configured to be connected to the joint assembly 30, and a second supporting frame 54 configured to connect the first supporting frame 53 and the supporting member 56.

The first supporting frame 53 may be hinge-connected to the joint assembly 30. A hinge axis of a hinge connection structure may intersect an axis of rotation of the joint assembly 30. For example, the hinge axis of the hinge connection structure and the axis of rotation of the joint assembly 30 may be orthogonal to each other. In this example, the second supporting frame 54 may perform a two degree of freedom motion with respect to the fixing member 20 by the hinge axis and the axis of rotation.

The second supporting frame 54 may be slidingly connected to the first supporting frame 53. In this example, the second supporting frame 54 may perform a three degree of freedom motion with respect to the fixing member 20.

Figure 3:
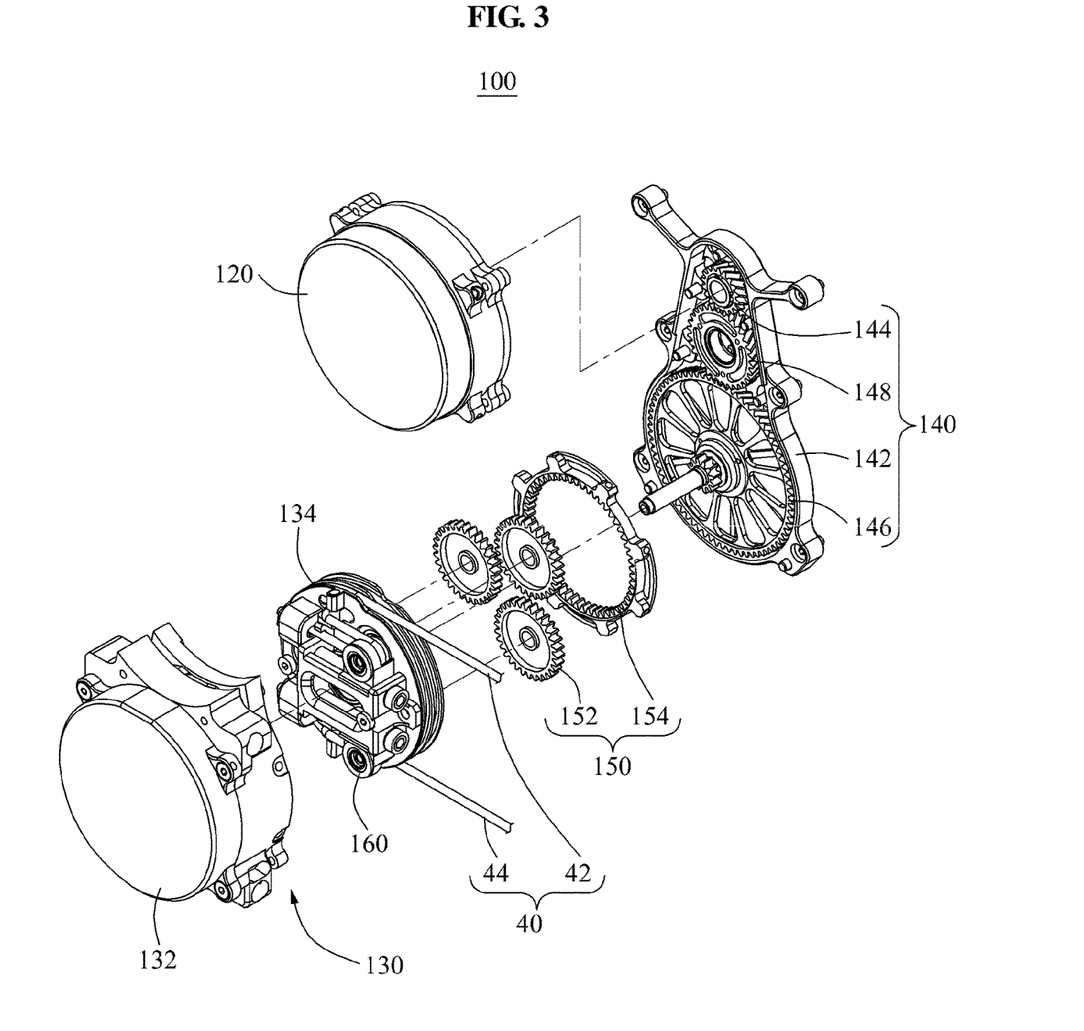
FIG. 3 is an exploded perspective view illustrating a driving module according to an example embodiment.
Figure 4:
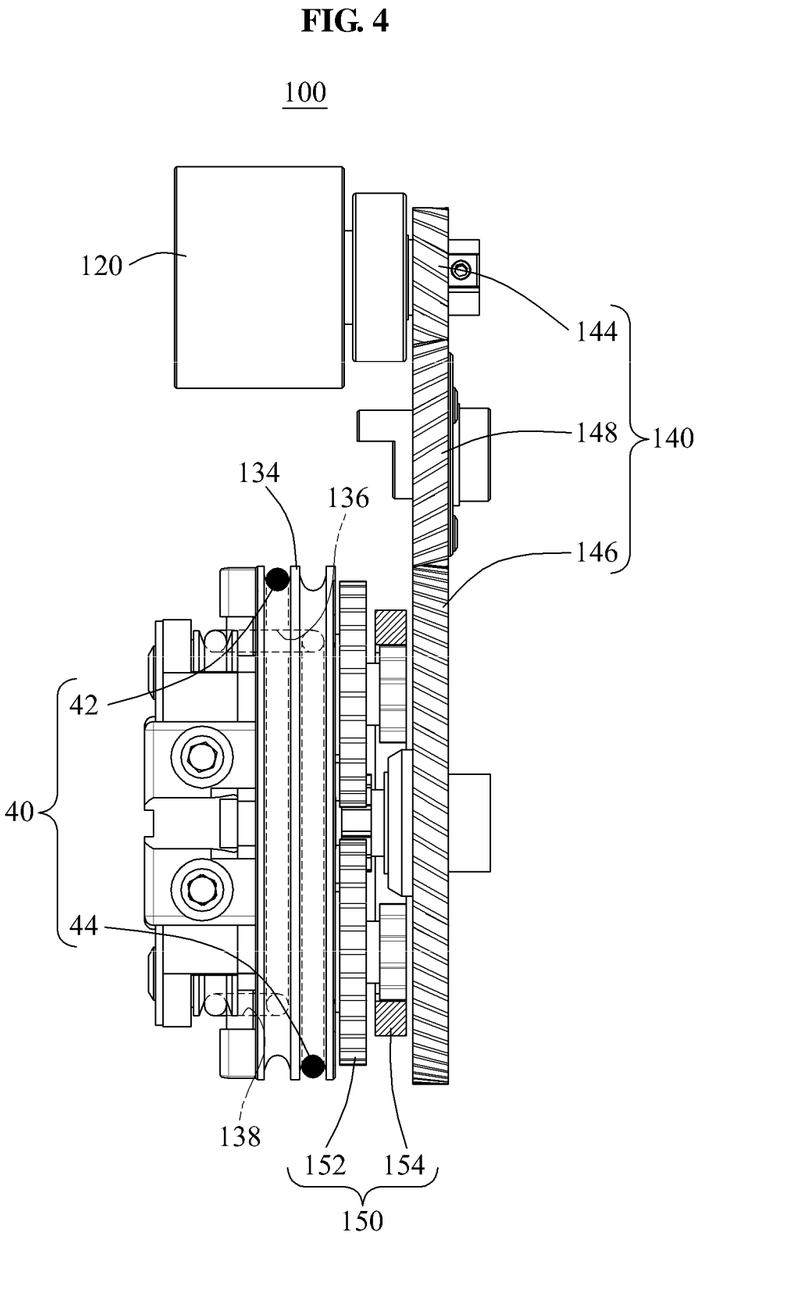
FIG. 4 is a cross-sectional view illustrating a driving module according to an example embodiment.
Figure 5:
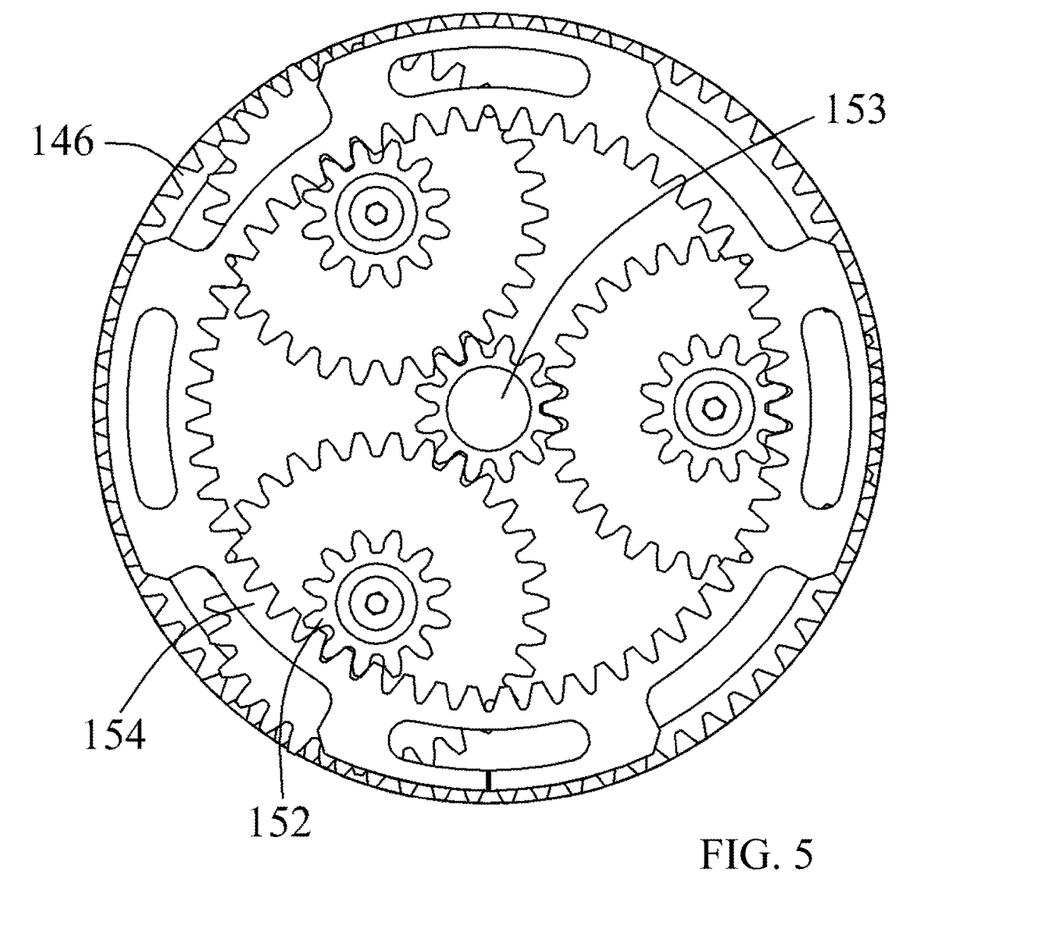
FIG. 5 illustrates a planetary decelerator according to an example embodiment.

FIG. 3 is an exploded perspective view illustrating the driving module 100 according to an example embodiment, FIG. 4 is a cross-sectional view illustrating the driving module 100 according to an example embodiment, and FIG. 5 illustrates a planetary decelerator according to an example embodiment.

Referring to FIGS. 3 through 5, the driving module 100 includes the driving source 120, the rotary body assembly 130, the first decelerator 140, a second decelerator 150, and a tensile force adjusting device 160.

The driving source 120 may include a frameless motor, an encoder, and a driving source case configured to cover the frameless motor and the encoder. Use of the frameless motor may reduce a volume of the driving source 120, thereby reducing an overall volume of the driving module 100. The driving source 120 may be disposed at an input terminal of the first decelerator 140.

The rotary body assembly 130 includes a power transmitting rotary body 134, and a rotary body case 132 configured to cover the power transmitting rotary body 134. The power transmitting rotary body 134 may be connected in parallel to the driving source 120. An axis of rotation of the power transmitting rotary body 134 and an axis of rotation of the driving source 120 may not match. The power transmitting rotary body 134 may be disposed at an output terminal of the first decelerator 140. The rotary body case 132 may include a hole through which the power transmitting member 40 to be connected to the power transmitting rotary body 134 is to penetrate.

The power transmitting rotary body 134 may include, at an outer circumferential surface of the power transmitting rotary body 134, a groove along which the power transmitting member 40 is to be wound. When a plurality of power transmitting members 40 is provided, the power transmitting rotary body 134 may include a first groove along which the first power transmitting member 42 is to be wound, and a second groove along which the second power transmitting member 44 is to be wound. The first groove and the second groove are provided separately, thereby preventing or mitigating an overlap between the first power transmitting member 42 and the second power transmitting member 44.

A first insertion hole 138 through which the first power transmitting member 42 is to penetrate is provided at one side of the first groove, and a second insertion hole 136 through which the second power transmitting member 44 is to penetrate is provided at one side of the second groove. The insertion holes 136 and 138 may be provided to penetrate from the respective grooves to one surface of the power transmitting rotary body 134. The first power transmitting member 42 and the second power transmitting member 46 may be inserted through the first insertion hole 138 and the second insertion hole 136, respectively, and be attached to the power transmitting rotary body 134.

A parallel gear type decelerator may be used for the first decelerator 140. In this example, the first decelerator 140 may also be referred to as a "parallel shaft decelerator". The first decelerator 140 may cover the driving source 120 and the power transmitting rotary body 134. The driving source 120 and the power transmitting rotary body 134 may be positioned in the same direction with respect to the first decelerator 140. The first decelerator 140 includes an input side rotary body 144, an output side rotary body 146, an idle rotary body 148, and a decelerator case 142 configured to surround the input side rotary body 144, the output side rotary body 146, and the idle rotary body 148.

The input side rotary body 144 may act as an input terminal of the first decelerator 140. The input side rotary body 144 may receive power from the driving source 120. An axis of rotation of the input side rotary body 144 and the axis of rotation of the driving source 120 may match.

The output side rotary body 146 may act as the output terminal of the first decelerator 140. The output side rotary body 146 may transmit power to the power transmitting rotary body 134. An axis of rotation of the output side rotary body 146 and the axis of rotation of the power transmitting rotary body 134 may match. The axis of rotation of the output side rotary body 146 may be parallel to the axis of rotation of the input side rotary body 144. A diameter of the output side rotary body 146 may be greater than a diameter of the input side rotary body 144.

The idle rotary body 148 may transmit power between the input side rotary body 144 and the output side rotary body 146. A diameter of the idle rotary body 148 may be greater than the diameter of the input side rotary body 144, and smaller than the diameter of the output side rotary body 146. The diameters of the input side rotary body 144, the idle rotary body 148, and the output side rotary body 146 may increase sequentially in an order of power transmission.

The decelerator case 142 may surround the input side rotary body 144, the idle rotary body 148, and the output side rotary body 146. A width of the decelerator case 142 may increase from one side toward another side.

Although the input side rotary body 144, the idle rotary body 148, and the output side rotary body 146 are illustrated as toothed gears, example embodiments are not limited thereto. The input side rotary body 144, the idle rotary body 148, and the output side rotary body 146 may be rotary bodies capable of transmitting power by rolling friction.

The second decelerator 150 may be interposed between the first decelerator 140 and the power transmitting rotary body 134. The second decelerator 150 may decelerate the power to be transmitted from the first decelerator 140 to the power transmitting rotary body 134. A planetary gear type decelerator may be used for the second decelerator 150. In this example, the second decelerator 150 may also be referred to as a "planetary decelerator". The second decelerator 150 includes a central rotary body 153, a connecting rotary body 152, and a ring member 154. Hereinafter, a case in which the connecting rotary body 152 acts as an output terminal of the second decelerator 150 will be described.

The central rotary body 153 may be provided on one side of the output side rotary body 146. The central rotary body 153 may rotate in a rotating direction of the output side rotary body 146. For example, the central rotary body may be attached to the output side rotary body 146 to perform a single rigid body motion with the output side rotary body 146. A diameter of the central rotary body may be smaller than the diameter of the output side rotary body 146. The central rotary body and the output side rotary body 146 may be a single compound gear.

The ring member 154 may be configured to not rotate in an internal portion of the driving module 100. For example, the ring member 154 may be attached to one side of the rotary body case 132. The ring member 154 may be provided to surround the central rotary body and the connecting rotary body 152. The inner circumferential surface of the ring member 154 may be connected or coupled to the connecting rotary body 152.

The connecting rotary body 152 may be connected between the central rotary body and the ring member 154. The connecting rotary body 152 may be connected or coupled to an outer circumferential surface of the central rotary body to rotate by power received from the central rotary body. The connecting rotary body 152 may be connected or coupled to the inner circumferential surface of the fixed ring member 154 to rotate along the inner circumferential surface of the ring member 154. The connecting rotary body 152 may revolve around the central rotary body 153.

The connecting rotary body 152 may be a compound gear. The connecting rotary body 152 may include a first portion coupled to or in contact with the outer circumferential surface of the central rotary body to rotate by power received from the central rotary body, and a second portion coupled to or in contact with the inner circumferential surface of the ring member 154 to rotate along the inner circumferential surface of the ring member 154. A diameter of the second portion may be smaller than a diameter of the first portion. The foregoing structure may achieve a relatively great deceleration ratio.

The connecting rotary body 152 may be connected to the power transmitting rotary body 134 to transmit power to the power transmitting rotary body 134. An axis of rotation of the connecting rotary body 152 may be fixed to the power transmitting rotary body 134. In this example, the power transmitting rotary body 134 may rotate in a revolving direction of the connecting rotary body 152. The axis of rotation of the power transmitting rotary body 134 and the axis of rotation of the connecting rotary body 152 may match. In some example embodiment, the power transmitting rotary body 134 may rotate in a rotating direction of the ring member 154.

When the central rotary body 153, the connecting rotary body 152, and the ring member 154 of the second decelerator 150 are provided as toothed gears as shown in FIG. 3, the central rotary body 153, the connecting rotary body 152, and the ring member 154 may also be referred to as a "sun gear", a "planetary gear", and a "ring gear", respectively. However, example embodiments are not limited thereto. The second decelerator 150 may include three pulleys capable of transmitting power by rolling friction. The central rotary body 153, the connecting rotary body 152, and the ring member 154 may be pulleys. The second decelerator 150 may have a harmonic drive structure. The central rotary body, the connecting rotary body 152, and the ring member 154 may correspond to a "wave generator", a "flexspline", and a "circular spline", respectively.

The tensile force adjusting device 160 may adjust a tensile force of the power transmitting member 40. For example, when deterioration brings a decrease in the tensile force of the power transmitting member 40, the tensile force adjusting device 160 may adjust the tensile force of the power transmitting member 40. The tensile force adjusting device 160 will be described in detail later.

Figure 6:
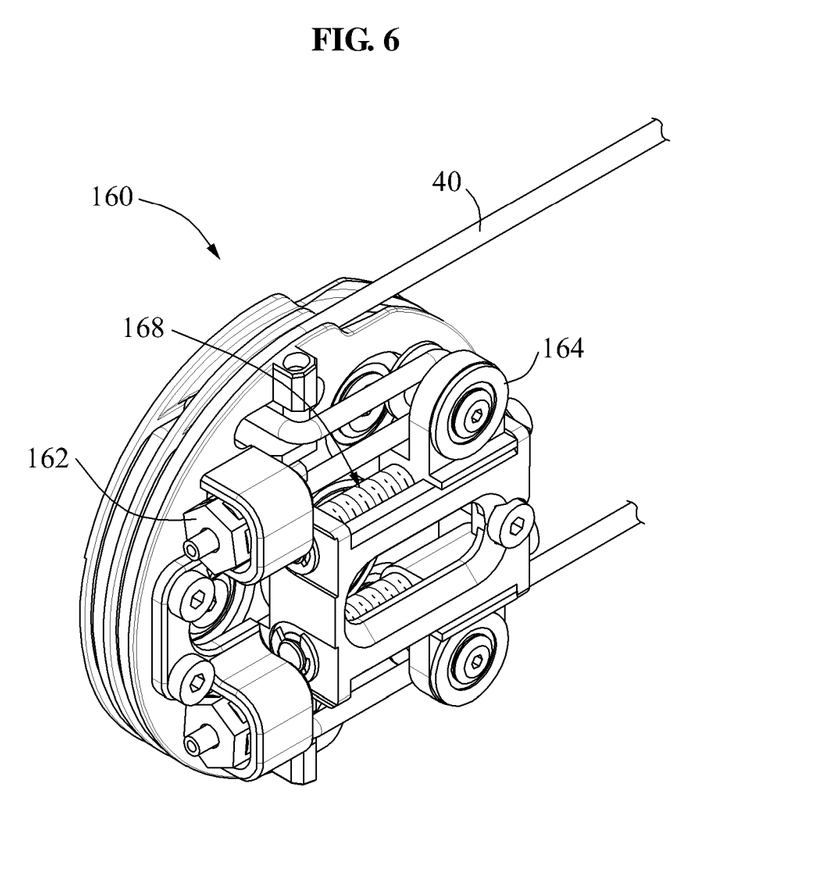
FIG. 6 is a perspective view illustrating a tensile force adjusting device according to an example embodiment.
Figure 7:
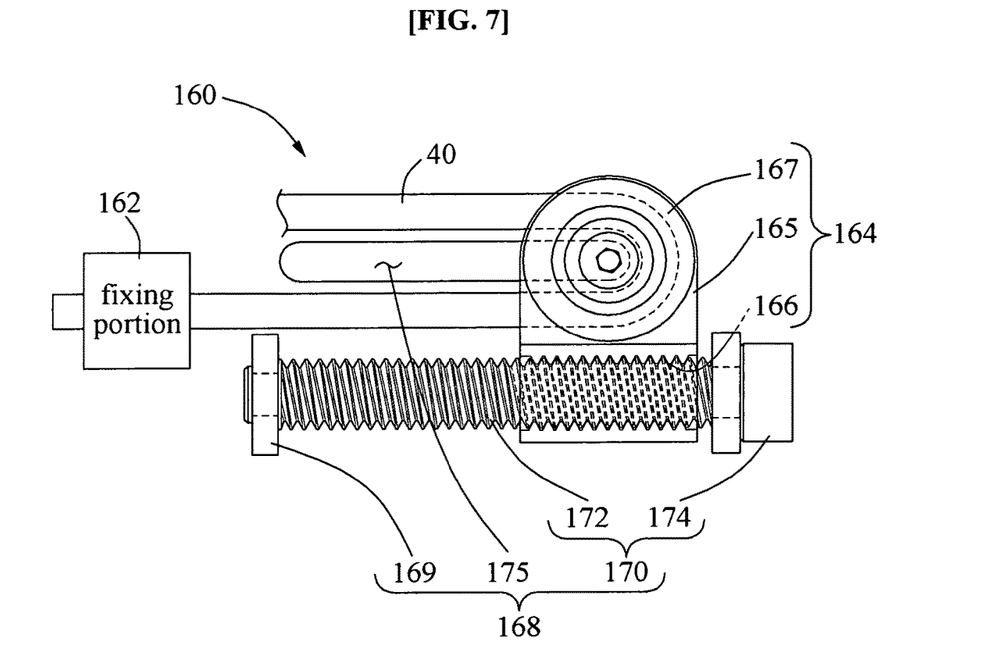
FIG. 7 is a front view illustrating a tensile force adjusting device according to an example embodiment.

FIG. 6 is a perspective view illustrating the tensile force adjusting device 160 according to an example embodiment, and FIG. 7 is a front view illustrating the tensile force adjusting device 160 according to an example embodiment.

Referring to FIG. 6, the tensile force adjusting device 160 includes a fixing portion 162, a hanging portion 164, and a hanging portion movement guide 168.

One end of the power transmitting member 40 may be attached to the fixing portion 162. The one end of the power transmitting member 40 may pass through an insertion hole and be fixed to the fixing portion 162.

One side of the power transmitting member 40 may be hung at the hanging portion 164. The hanging portion 164 includes a hanging body 165, and a hanging pulley 167.

The hanging body 165 may move along the hanging portion movement guide 168. The hanging body 165 includes a guide hole 166 having a shape corresponding to a screw 170 of the hanging portion movement guide 168. In the foregoing structure, the hanging body 165 may move in a leftward direction or a rightward direction depending on a rotating direction of the screw 170.

The hanging pulley 167 may be rotatably provided on one side of the hanging body 165. One side of the power transmitting member 40 may be hung at the hanging pulley 167. The hanging pulley 167 may reduce a frictional force applied to the power transmitting member 40 when adjusting the tensile force of the power transmitting member 40, thereby extending a lifespan of the power transmitting member 40.

The hanging portion movement guide 168 may guide a movement of the hanging portion 164. The hanging portion movement guide 168 includes a screw separation preventing portion 169, the screw 170, and a rotation preventing portion 175.

The screw 170 includes a screw body 172 of which a portion is threaded, and a screw head 174 disposed at an end portion of the screw body 172. The screw body 172 may be helically connected to the guide hole 166. A user may easily rotate the screw 170 by gripping the screw head 174.

The screw separation preventing portion 169 may prevent or mitigate a separation of the screw 170. For example, screw separation preventing portions 169 may be disposed on both sides of the screw 170, respectively, to enable the screw 170 to rotate at a desired (or alternatively, predetermined) position.

The rotation preventing portion 175 may restrain one side of the hanging portion 164 to prevent or mitigate rotation of the hanging portion 164 with respect to the screw 170. For example, the rotation preventing portion 175 may be a slot provided at one side of the power transmitting rotary body 134. An axis of rotation of the hanging pulley 167 may be inserted into the slot. In the foregoing structure, when the screw 170 rotates, the hanging portion 164 may slide in a longitudinal direction of the screw 170, rather than rotating.

Hereinafter, an action of the tensile force adjusting device 160 will be described.

When the screw 170 rotates, the hanging portion 164 may slide in the longitudinal direction of the screw 170. Thus, a distance between the fixing portion 162 and the hanging portion 164 may be adjusted. As the distance between the fixing portion 162 and the hanging portion 164 increases, the tensile force of the power transmitting member 40 may increase. Conversely, as the distance between the fixing portion 162 and the hanging portion 164 decreases, the tensile force of the power transmitting member 40 may decrease. When the hanging portion 164 is moved to one side, the tensile force of the power transmitting member 40 may increase. Conversely, when the hanging portion 164 is moved to another side, the tensile force of the power transmitting member 40 may decrease.

As shown in FIG. 7, the power transmitting member 40 may extend from the insertion hole in one direction to be hung over the hanging pulley 167, and extend from the hanging pulley 167 in an opposite direction to be attached to the fixing portion 162. In this example, the hanging pulley 167 may function as a movable pulley. In the foregoing structure, a change in a length of the power transmitting member 40 may be twice a change in a moving distance of the hanging portion 164. Thus, a space for movement of the hanging portion 164 may be reduced, and the tensile force of the power transmitting member 40 may be adjusted sufficiently.

The description provided above is merely an example of the tensile force adjusting device 160, and structures and configuration of the tensile force adjusting device 160 are not limited thereto. For example, the power transmitting member 40 may be attached to the hanging portion 164, and the tensile force adjusting device 160 may not include the fixing portion 162.

Hereinafter, the same name may be used to describe an element included in the example embodiments described above and an element having a common function. Unless otherwise mentioned, the descriptions on the foregoing example embodiments may be applicable to the following example embodiments and thus, duplicated descriptions will be omitted for conciseness.

Figure 8:
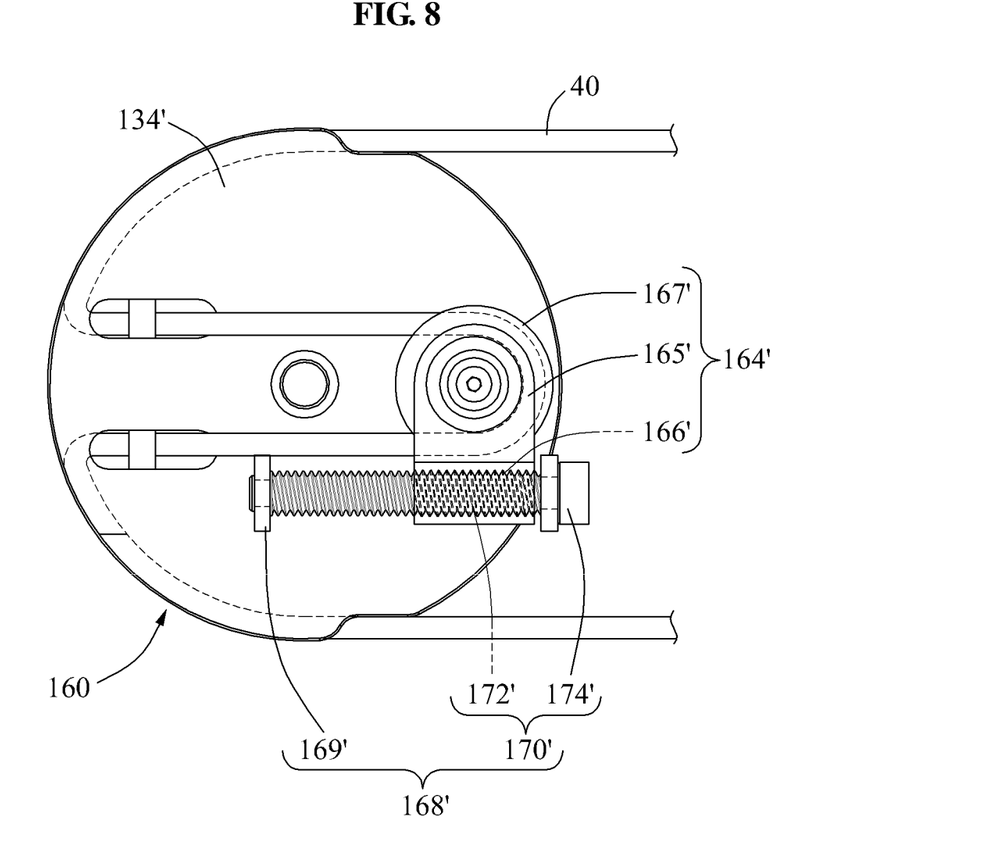
FIG. 8 illustrates a tensile force adjusting device, in which a single power transmitting member is wound over a power transmitting rotary body, according to an example embodiment.

FIG. 8 illustrates the tensile force adjusting device 160, in which a single power transmitting member is wound over a power transmitting rotary body, according to an example embodiment. FIG. 8 illustrates an example of the tensile force adjusting device 160 applicable to a case in which a single power transmitting member 40 is wound over a power transmitting rotary body 134'.

The tensile force adjusting device 160 includes a hanging portion 164', and a hanging portion movement guide 168'. The hanging portion 164' includes a hanging body 165', and a hanging pulley 167'. The hanging body 165' includes a guide hole 166'. The hanging portion movement guide 168' includes a screw separation preventing portion 169', and a screw 170. The screw 170' includes a screw body 172', and a screw head 174'.

The hanging pulley 167' may be rotatably provided on the hanging body 165'. The hanging pulley 167' may slide with respect to the power transmitting rotary body 134'. The hanging pulley 167' may move in a direction traversing a center of rotation of the power transmitting rotary body 134'. One side of the power transmitting member 40 may be hung at the hanging pulley 167'.

The tensile force adjusting device 160 may not include a separate fixing portion. In this example, when a tensile force of a portion disposed on an upper side of the power transmitting member 40 differs from a tensile force of a portion disposed on a lower side of the power transmitting member 40, the hanging pulley 167' may rotate to equalize the tensile forces. Thus, by adjusting a single hanging portion 164', the tensile force of the entire power transmitting member 40 may be adjusted.

Figure 9:
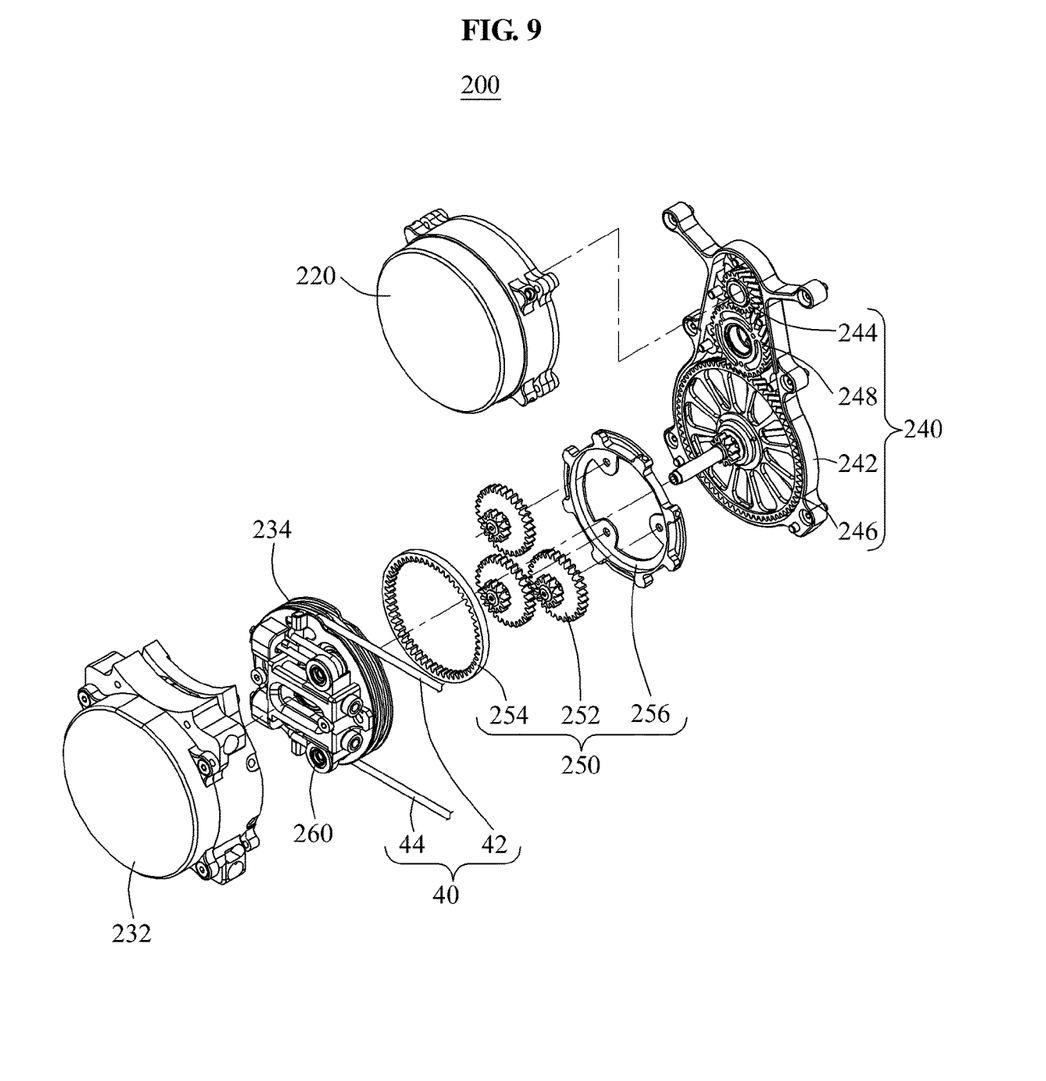
FIG. 9 is an exploded perspective view illustrating a driving module according to an example embodiment.
Figure 10:
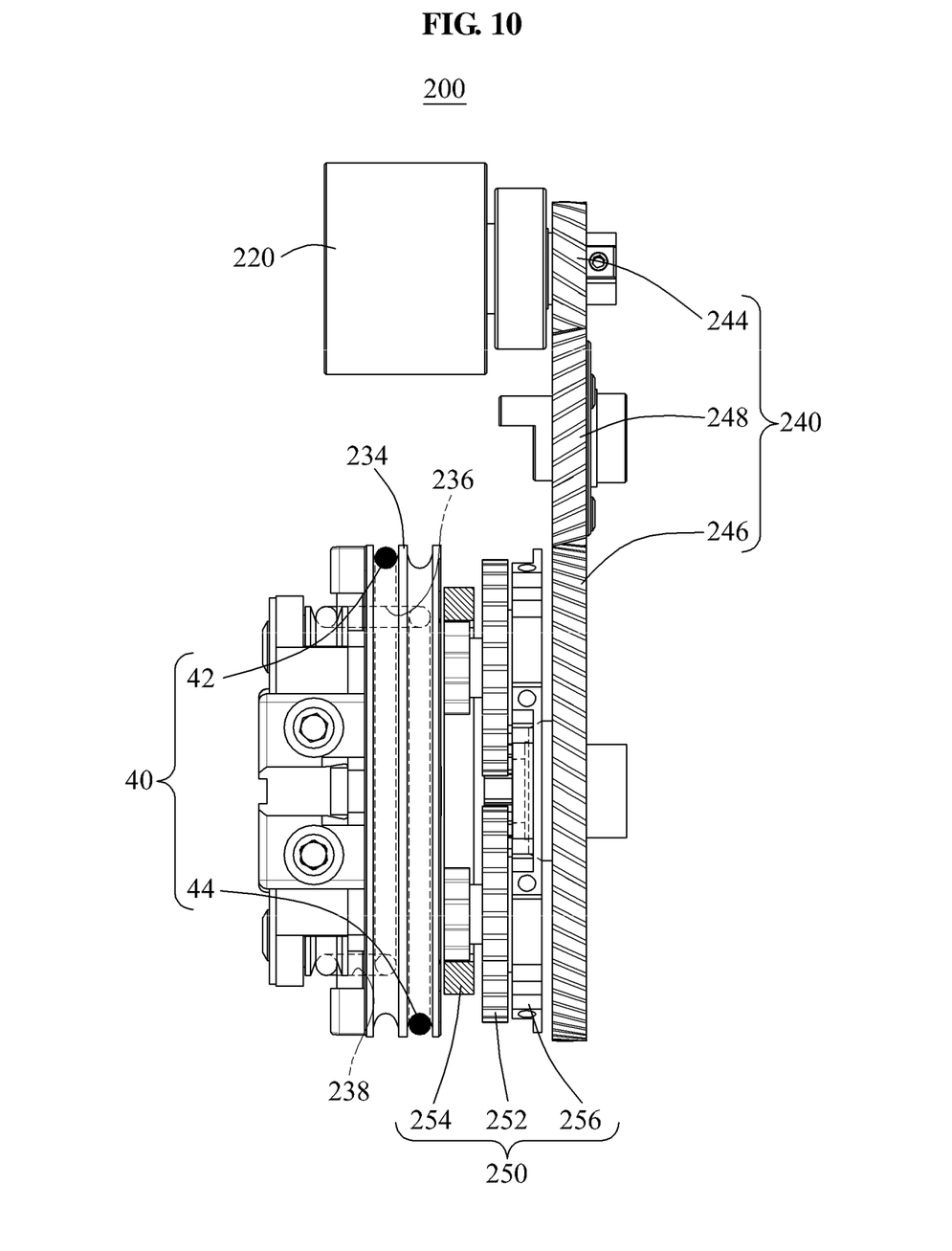
FIG. 10 is a cross-sectional view illustrating a driving module according to an example embodiment.

FIG. 9 is an exploded perspective view illustrating a driving module 200 according to an example embodiment, and FIG. 10 is a cross-sectional view illustrating the driving module 200 according to an example embodiment.

Referring to FIGS. 9 and 10, the driving module 200 includes a driving source 220, a rotary body assembly 230, a first decelerator 240, a second decelerator 250, and a tensile force adjusting device 260.

The rotary body assembly 230 includes a power transmitting rotary body 234, and a rotary body case 232.

The first decelerator 240 includes a decelerator case 242, an input side rotary body 244, an output side rotary body 246, and an idle rotary body 248.

The second decelerator 250 may be interposed between the first decelerator 240 and the power transmitting rotary body 234. The second decelerator 250 may decelerate power to be transmitted from the first decelerator 240 to the power transmitting rotary body 234. The second decelerator 250 includes a central rotary body (not shown), a connecting rotary body 252, a ring member 254, and a carrier 256. Hereinafter, a case in which the ring member 254 acts as an output terminal of the second decelerator 250 will be described.

The carrier 256 may be configured to not rotate in an internal portion of the driving module 200. For example, the carrier 256 may be attached to one side of the rotary body case 232. The carrier 256 and the rotary body case 232 may be provided integrally.

The connecting rotary body 252 may be coupled to the carrier 256 in a fixed manner. The connecting rotary body 252 may be provided between the central rotary body and the ring member 254. The connecting rotary body 252 may receive power from the central rotary body, and transmit the power to the ring member 254.

The connecting rotary body 252 may be a compound gear. The connecting rotary body 252 may include a first portion configured to be coupled with or in contact with an outer circumferential surface of the central rotary body, and a second portion configured to be coupled with or in contact with an inner circumferential surface of the ring member 254. A diameter of the second portion may be smaller than a diameter of the first portion. The foregoing structure may achieve a relatively great deceleration ratio.

The ring member 254 may surround the central rotary body and the connecting rotary body 252. The inner circumferential surface of the ring member 254 may be connected to an outer circumferential surface of the connecting rotary body 252. The ring member 254 may rotate by power received from the connecting rotary body 252.

The ring member 254 may be coupled or connected to the power transmitting rotary body 234 to transmit power to the power transmitting rotary body 234. For example, the ring member 254 may perform a single rigid body motion with the power transmitting rotary body 234. The ring member 254 and the power transmitting rotary body 234 may be provided integrally.

When the central rotary body, the connecting rotary body 252, and the ring member 254 of the second decelerator 250 are provided as toothed gears as shown in FIG. 9, the central rotary body, the connecting rotary body 252, and the ring member 254 may also be referred to as a "sun gear", a "planetary gear", and a "ring gear", respectively. However, example embodiments are not limited thereto. The second decelerator 250 may include three pulleys capable of transmitting power by rolling friction. The central rotary body, the connecting rotary body 252, and the ring member 254 may be pulleys. The second decelerator 250 may have a harmonic drive structure. The central rotary body, the connecting rotary body 252, and the ring member 254 may correspond to a "wave generator", a "flexspline", and a "circular spline", respectively.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A driving module comprising:
   a driving source configured to transmit power;
   a power transmitting rotary body configured to rotate by the power transmitted from the driving source; and
   a first decelerator configured to transmit power between the driving source and the power transmitting rotary body, the first decelerator including,
      an input side rotary body configured to receive power from the driving source,
      an output side rotary body configured to transmit power to the power transmitting rotary body, and
      an idle rotary body configured to transmit power between the input side rotary body and the output side rotary body,
   wherein diameters of the input side rotary body, the idle rotary body, and the output side rotary body increase sequentially in an order of power transmission.

2. The driving module of claim 1, wherein the driving source and the power transmitting rotary body are in a same direction with respect to the first decelerator.

3. A driving module comprising:
   a driving source configured to transmit power;
   a power transmitting rotary body configured to rotate by the power transmitted from the driving source;
   a first decelerator configured to transmit power between the driving source and the power transmitting rotary body, the first decelerator including,
      an input side rotary body configured to receive power from the driving source, and
      an output side rotary body configured to transmit power to the power transmitting rotary body; and
   a second decelerator between the first decelerator and the power transmitting rotary body, the second decelerator including,
      a central rotary body configured to receive power transmitted from the first decelerator,
      a connecting rotary body coupled to an outer circumferential surface of the central rotary body, and
      a ring member surrounding the central rotary body and the connecting rotary body, and coupled to the connecting rotary body.

4. The driving module of claim 3, wherein the connecting rotary body comprises:
   a first portion coupled to the outer circumferential surface of the central rotary body; and
   a second portion coupled to an inner circumferential surface of the ring member, the second portion having a smaller diameter than the first portion.

5. The driving module of claim 3, wherein the ring member is configured to not rotate in an internal portion of the driving module, and
   the power transmitting rotary body is configured to rotate in a revolving direction of the connecting rotary body.

6. The driving modulo of claim 3, wherein the connecting rotary body is configured to rotate at a position in an internal portion of the driving module, and
   the power transmitting rotary body is configured to rotate in a rotating direction of the ring member.

7. A driving module comprising:
   a driving source configured to transmit power;
   a power transmitting rotary body configured to rotate by the power transmitted from the driving source;

a first decelerator configured to transmit power between the driving source and the power transmitting rotary body, the first decelerator including,
an input side rotary body configured to receive power from the driving source, and
an output side rotary body configured to transmit power to the power transmitting rotary body;
a power transmitting member configured to be driven by rotation of the power transmitting rotary body; and
a tensile force adjusting device configured to adjust a tensile force of the power transmitting member.

8. The driving module of claim 7, wherein the tensile force adjusting device comprises:
a hanging portion configured to move with respect to the power transmitting rotary body, at which one side of the power transmitting member is hung,
wherein the tensile force of the power transmitting member increases when the hanging portion moves to one side, and the tensile force of the power transmitting member decreases when the hanging portion moves to another side.

9. The driving module of claim 8, wherein the power transmitting rotary body comprises:
a groove along which a portion of the power transmitting member is wound; and
an insertion hole on one side of the groove,
wherein one side of the power transmitting member penetrates through the insertion hole and is hung at the hanging portion.

10. The driving module of claim 9, wherein the tensile force adjusting device further comprises:
a fixing portion configured to attach to one end of the power transmitting member; and
a hanging portion movement guide configured to guide a moving direction of the hanging portion,
wherein the power transmitting member extends from the insertion hole in one direction to be hung over the hanging portion, and extends from the hanging portion in a direction opposite to the one direction to be attached to the fixing portion.

11. The driving module of claim 10, wherein the hanging portion is configured to slide along the hanging portion movement guide.

12. The driving module of claim 11, wherein
the hanging portion movement guide comprises
a screw, and
a separation preventing portion configured to prevent separation of the screw, and the hanging portion comprises
a hanging body including a guide hole corresponding to the screw, and
a hanging pulley rotatably provided on the hanging body, at which one side of the power transmitting member is hung.

13. A motion assistance apparatus comprising:
a fixing member configured to be attached to a user;
a driving module on one side of the fixing member, the driving module including a driving source, a power transmitting rotary body, and a parallel shaft decelerator, the power transmitting rotary body configured to rotate by power transmitted from the driving source, the parallel shaft decelerator configured to transmit power between the driving source and the power transmitting rotary body, the parallel shaft decelerator including an input side rotary body and an output side rotary body, the input side rotary body configured to receive power from the driving source, the output side rotary body configured to transmit power to the power transmitting rotary body;
a supporting module configured to support a portion of the user; and
a power transmitting member configured to transmit power between the power transmitting rotary body and the supporting module,
wherein the driving module further comprises a tensile force adjusting device configured to adjust a tensile force of the power transmitting member.

14. The motion assistance apparatus of claim 13, further comprising:
a planetary decelerator between the output side rotary body and the power transmitting rotary body.

15. The motion assistance apparatus of claim 14, wherein an axis of rotation of the output side rotary body, a central axis of rotation of the planetary decelerator, and an axis of rotation of the power transmitting rotary body are in a same direction.

16. The motion assistance apparatus of claim 13, wherein the tensile force adjusting device comprises:
a hanging portion configured to move with respect to the power transmitting rotary body, at which one side of the power transmitting member is hung,
wherein the tensile force of the power transmitting member increases when the hanging portion moves to one side, and the tensile force of the power transmitting member decreases when the hanging portion moves to another side.

* * * * *